Feb. 5, 1946.  R. W. CLARK ET AL  2,394,427

WAVE LENGTH MODULATION

Filed Nov. 9, 1942

INVENTORS
ROBERT W. CLARK, FRANK J. SOMERS
BY H.S. Grover
ATTORNEY

Patented Feb. 5, 1946

2,394,427

UNITED STATES PATENT OFFICE 2,394,427

WAVE LENGTH MODULATION

Robert W. Clark, Teaneck, N. J., and Frank J. Somers, Rockville Centre, N. Y., assignors to Radio Corporation of America, a corporation of Delaware Application November 9, 1942, Serial No. 464,978

4 Claims. (Cl. 179—171.5)

This application discloses a new and improved method of and means for generating and modulating, in accordance with signals, oscillations of carrier wave frequency.

An object of our invention is to provide a simplified and improved carrier wave generator and wave length modulator and to do so we have provided a new and improved generator and wave length modulator wherein a single tube oscillations are generated in a tank circuit including as a tuning element thereof a simulated reactance of controllable value in the form of a reactive effect produced between electrodes in the said single tube, the value of which depends upon the tube conductance which may be controlled in accordance with signals.

In describing our invention in detail reference will be made to the attached drawing, wherein Figures 1 to 6 inclusive each shows a different form of a wave generator and wave length modulator arranged as described above.

Figures 3 to 6 inclusive also include means for controlling the tube conductance to thereby modulate the wave length of the oscillations generated.

In the above description and hereinafter reference is made to wave length modulation or modulation of the instantaneous frequency of the generated oscillations and such terms are intended to cover phase modulation, frequency modulation, or modified forms of phase modulation or frequency modulation or phase and frequency modulation.

Figure 1:
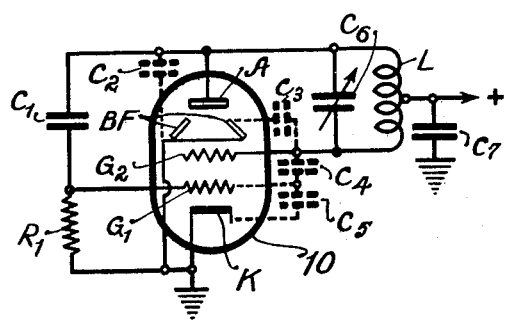

In Figure 1 the tube 10 has its anode A and second grid G2 connected by a tank circuit comprising condenser C6 and inductance L. A point on the inductance L is connected to ground by a condenser C7, which is large and in effect grounds the said point on L with respect to voltages of the generated frequency. The cathode K is grounded as shown. These electrodes as connected when energized produce oscillations by virtue of the fact that the generated potentials on the anode A and grid G2 are of opposed polarity and that the cathode is of a phase between the phases of the voltages on the grid G2 and anode A.

The anode A is connected by condenser C1 to the grid G1, which is connected to ground and cathode by a resistor R1. C1 is the feedback capacitor, while R1 is the bias resistor for G1 and also serves, as will appear in detail hereinafter, with C1 and the capacity between the tube electrodes as described hereinafter to provide from the anode A to the grid G1 a voltage substantially in phase quadrature with respect to the voltage at the anode A end of the tank C6—L. The beam forming plates BF are connected to the cathode and ground. The dotted condenser C2 represents the internal and external capacity between the anode A and ground. The dotted condenser C3 represents the internal and external capacity between the grid G2 and ground. The condenser C4 represents the internal and external capacity between grids G1 and G2, while the dotted condenser C5 represents the internal and external capacity between the grid G1 and ground.

As stated above, the circuit oscillates due to the mutual conductance of grid G2. The frequency is determined by C3 and a developed tube reactance described below, the values of L, C6 and C2.

If the impedance of C1 is considerably greater than the impedance of R1, the voltage on G1 will be 90° out of phase with respect to the voltage at the anode end of the tank circuit L—C6, that is, with respect to the voltage across the tank circuit. There is also feedback from G2 to G1 through C4 but C1 is made greater than C4 so that the voltage supplied from the anode to G1 is larger than the voltage supplied from the grid G2 to G1 and, therefore, predominates so that the voltage on the grid G1 is substantially in phase quadrature with the voltage on the anode A and across the tank circuit. C5 is in shunt to R1 and affects the amount of phase shift obtainable. Of course, it will be understood that all of the tube capacities illustrated must be taken into consideration when dimensioning the tank circuit elements and the phase shifting circuit including C1 and R1.

Since the radio-frequency voltage on the grid G1 is 90° out of phase with respect to the radio-frequency voltage across the tank circuit, a change in grid bias will change the mutual conductance of the tube, thereby varying the amount of the out-of-phase plate current. This change in out-of-phase plate current acts as a change in reactance across the tank circuit L—C6 causing a shift in frequency. As a consequence, by controlling the bias of the grid or by controlling the tube conductance in any other manner in accordance with control or signal voltage, corresponding control of the wave length of the oscillations generated is accomplished.

The condenser C1 may be replaced by an inductance in series with a large blocking and coupling condenser. When this is done, the phase of the voltage on the grid G1 may lag the voltage on the anode A about 90°, whereas the grid voltage leads the anode voltage where C is used as shown.

Figure 2:
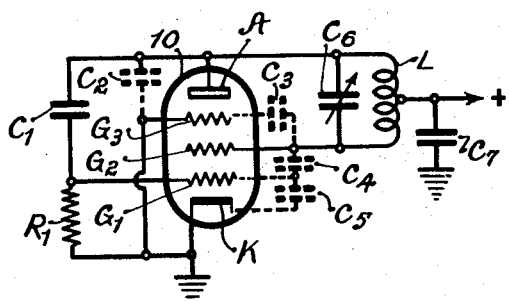

The principle involved in Figure 1 is applicable to tubes of the pentode type and an application thereof to such a tube is illustrated in Figure 2. In Figure 2, the suppressor grid G3 takes the part of the beam forming plates BF of Figure 1. The arrangement of Figure 2 is similar in many respects to the arrangement of Fig. 1, and the operation of the embodiment of Fig. 2 is in general the same as the operation of the arrangement of Fig. 1.

We may also apply our invention to tetrodes as illustrated in Figures 3, 4, 5 and 6.

Figure 3:
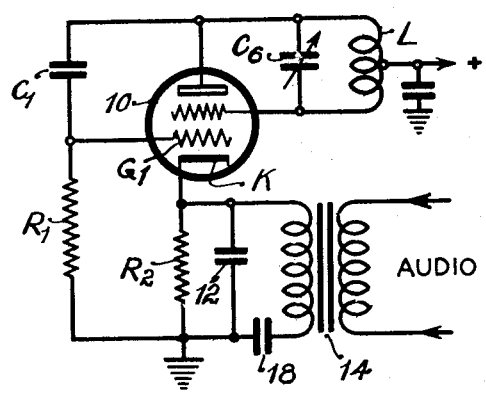

In Figure 3 the oscillation generating circuit and phase quadrature feedback arrangement is as in Figure 1 and needs no further description. In Figure 3, however, the cathode K is maintained above ground for potentials of modulation frequency by resistor R2, but is at ground radio-frequency potential by virtue of the bypassing effect of condenser 12. A transformer 14 has its secondary winding connected in shunt to R2 by way of a coupling condenser 18 and its primary winding supplied by control or modulating potentials of the desired nature. The potential on the cathode K is varied in accordance with the control or signal voltages with respect to current, and, as a consequence, with respect to the grid G1 so that the tube's conductance and/or gain is correspondingly varied to thereby vary the out-of-phase current in the plate circuit.

In Figure 4 the cathode is again raised above ground for voltages of modulation or control frequency and an additional tube 20 has its cathode connected to ground by way of a portion of resistor R1. The tube 20 has its control grid supplied with controlling potentials to thereby vary its cathode current to vary the bias on the grid G1 by varying the current through R1 and the voltage drop therein. The arrangement of Figure 4 is otherwise as in the prior figures.

Figure 5:
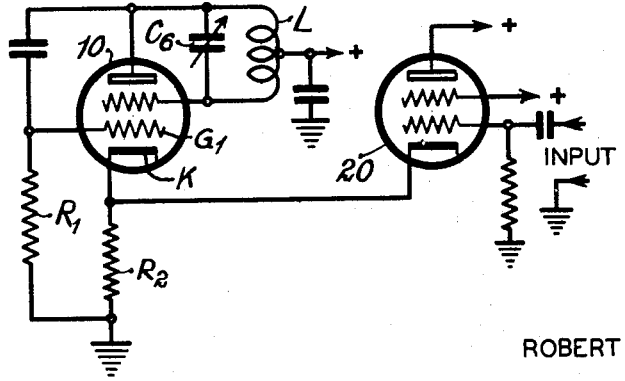

The arrangement of Figure 5 is similar in many respects to the arrangement in Figure 3 but includes an additional modulation or control potential amplifier 20 with its cathode connected to ground by way of the resistor R2, this modulation coupling being more direct than the corresponding coupling between the cathode circuit of tube 10 and the modulation source in Figure 3. Here again, however, modulation is accomplished by virtue of control of the tube conductance and/or gain.

Figure 4:
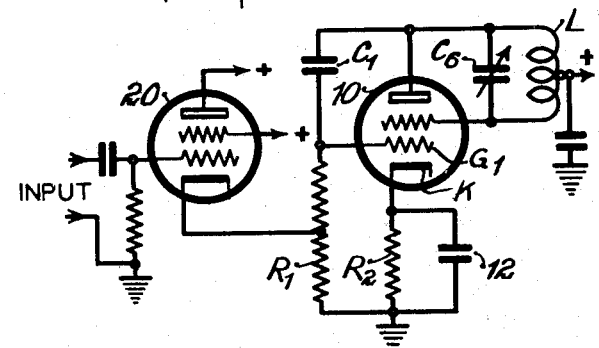
Figure 6:
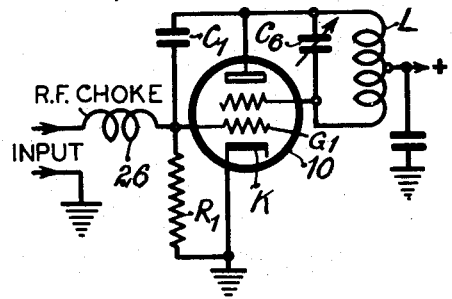

In the arrangement of Figure 6 grid bias modulation is accomplished as in Figure 4. However, in Figure 6 the modulating potentials are applied across the resistor R1 by way of radio-frequency choke 26 which prevents the generated high frequency oscillations from reaching the modulation source.

In all of the modifications the condenser C6 may be omitted, in which case tuning is accomplished by L and the distributed external and internal capacities. The tuning circuits of the various modifications may be composed of lumped constants, as shown, or these tuning circuits may comprise a parallel line with its distributed capacity and inductance or concentric line circuits.

The phase shifted feedback may be, in some cases where high enough frequencies are involved, obtained through the capacity C4 alone, in which case C1 is removed; or it may be accomplished with C1 removed and a capacity added in parallel to C4.

In a practical application of our invention with the oscillator operating at approximately 27 megacycles, a deviation of 800 k. c. was obtained. With a parallel line circuit replacing C6 and L and using a frequency of 150 megacycles, a deviation of 4 megacycles was obtained.

What is claimed is:

1. In apparatus of the class described, an electron discharge device having electrodes including an electron receiving electrode, a cathode, an auxiliary electrode and an electron flow control electrode, reactances in a tank circuit coupling said electron receiving electrode, said auxiliary electrode, and said cathode in a regenerative circuit for the production of oscillatory energy, a phase shifting network coupling said tank circuit to said electron flow control electrode for deriving voltage of the frequency of the oscillatory energy and applying the same to said electron flow control electrode substantially in phase quadrature with respect to the generated voltage on the electron receiving electrode, and connections for varying the conductance of said device in accordance with signals including a connection of high impedance to potentials of signal frequency connecting said cathode to ground and connections for applying signal potentials across said last mentioned impedance.

2. In apparatus of the class described, an electron discharge tube having electrodes including at least an electron receiving electrode, a cathode and two auxiliary electrodes, a radio frequency tank circuit coupled between said electron receiving electrode and one of said auxiliary electrodes, a radio frequency coupling between a point on said tank circuit and the cathode of said tube whereby oscillations are generated in said tank circuit when the tube electrodes are energized, a phase shifting network for deriving a voltage of the frequency of the generated oscillations and applying the said voltage to said electron flow control electrode substantially in phase quadrature with respect to the phase of the generated voltage on the electron receiving electrode, an impedance coupling the cathode of said tube to ground, a modulator tube having a cathode coupled directly to the cathode of said first tube, said modulator tube having a control grid and connections for applying modulating potentials to said control grid.

3. In apparatus of the class described, an electron discharge tube having electrodes including at least an anode, a cathode and two control grid electrodes, a tank circuit coupled between said anode and one control grid electrode, a coupling of low impedance to voltages of high frequency between a point on said tank circuit and said cathode, a coupling of high impedance to voltages of control potential frequency between said cathode and ground, an impedance coupling the other of said control electrodes to the cathode of said tube, a reactance coupling said tank circuit to the other of said control electrodes, the size of said reactance being large relative to the impedance between said other control electrode and said cathode, a modulator tube having a cathode connected to ground through a part at least of one of said impedances, said modulator tube having a control grid, and connections to the control grid of said modulator tube for applying thereto a control potential.

4. In apparatus of the class described, an electron discharge tube having electrodes including at least an anode, a cathode and two control grid electrodes, a tank circuit coupled between said anode and one control grid electrode, a coupling of low impedance to voltages of high frequency between a point on said tank circuit and said cathode, an impedance coupling the other of said control electrodes to the cathode of said tube, a reactance coupling said tank circuit to the other of said control electrodes, the size of said reactance being large relative to the impedance of said impedance, a modulator tube having a cathode in a direct current circuit including a part at least of said impedance, said modulator tube having a control grid, and connections to the control grid of said modulator tube for applying thereto a control potential.

ROBERT W. CLARK.
FRANK J. SOMERS.